June 12, 1962
R. E. BRECHTEL
3,038,481
AUTOMATIC CAR WASH
Filed April 6, 1959
3 Sheets-Sheet 1
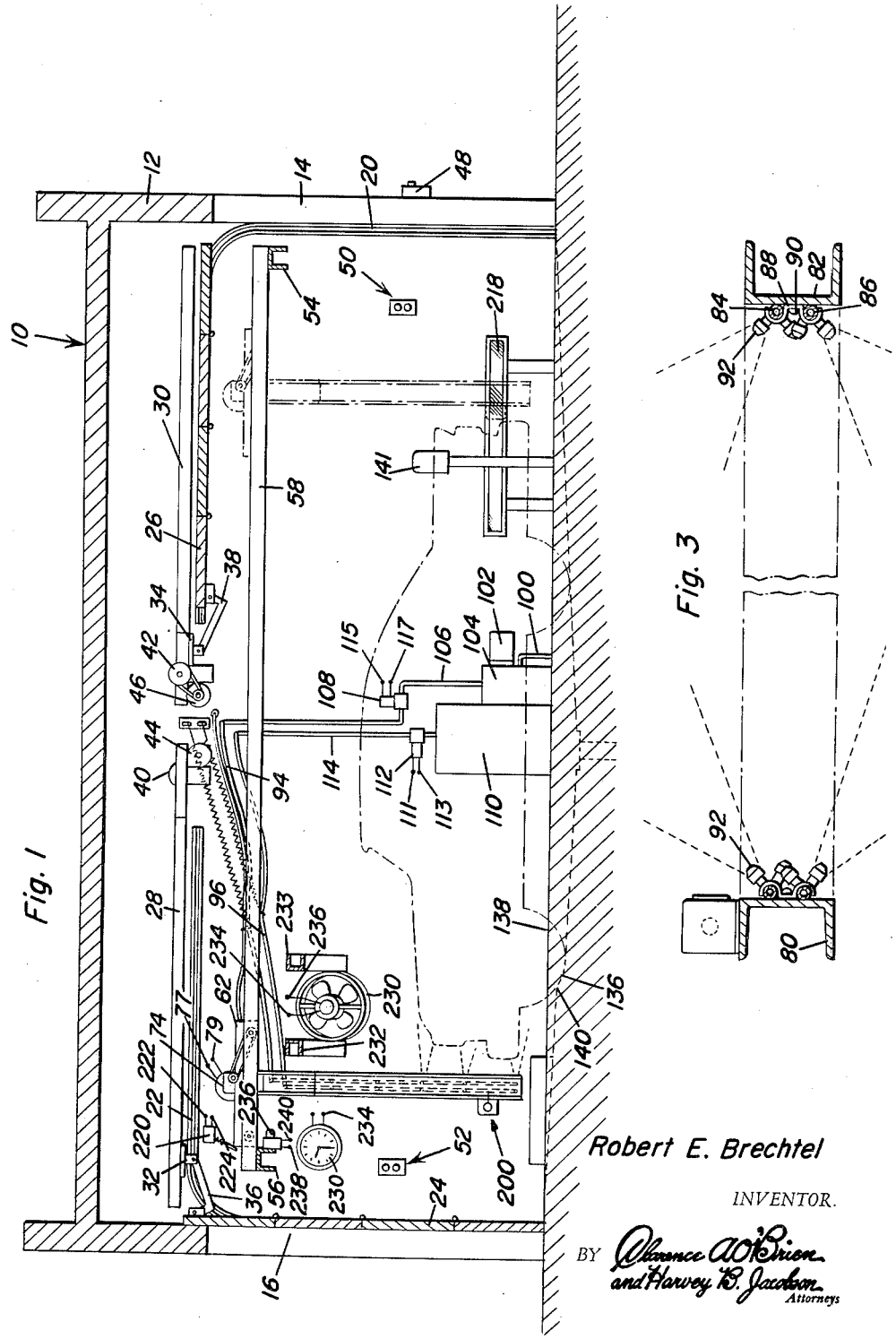
Robert E. Brechtel
INVENTOR.

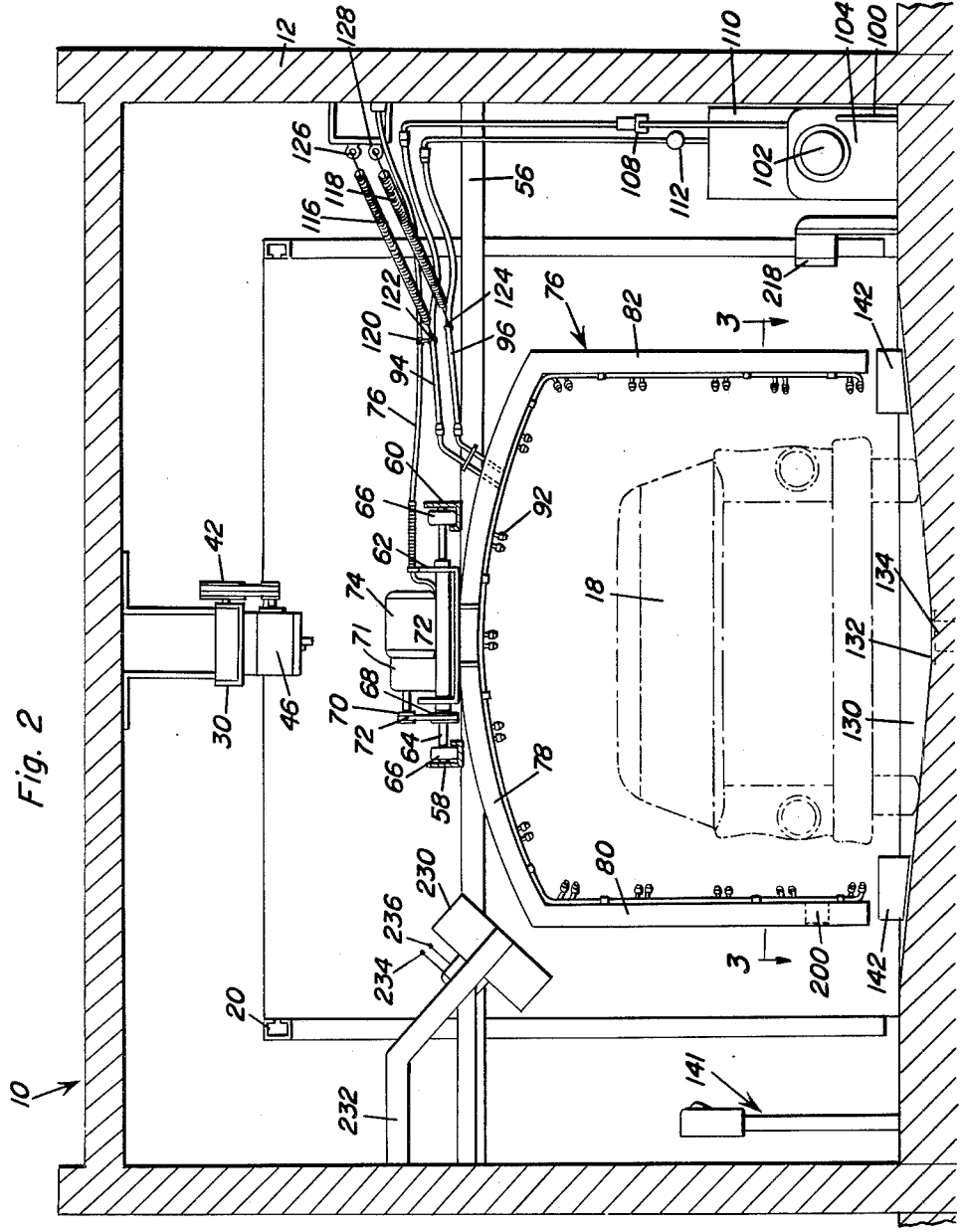

June 12, 1962    R. E. BRECHTEL    3,038,481
AUTOMATIC CAR WASH
Filed April 6, 1959    3 Sheets-Sheet 3
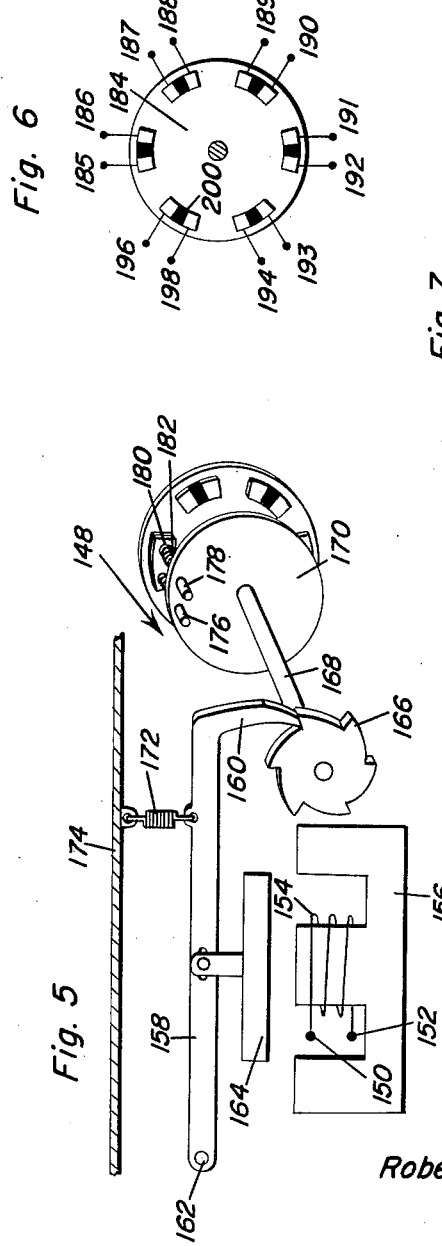
Robert E. Brechtel
INVENTOR.
BY Clarence A. O'Brien
and Harvey B. Jacobson
Attorneys

United States Patent Office 3,038,481
Patented June 12, 1962

3,038,481
AUTOMATIC CAR WASH
Robert E. Brechtel, 279 N. Broadway, Apt. 5J,
Yonkers, N.Y.
Filed Apr. 6, 1959, Ser. No. 804,358
6 Claims. (Cl. 134—57)

This invention relates generally to car washing apparatus and more particularly to an automobile coin-operated car wash.

In recent years, automatic two-minute car washers have become extremely popular amongst automobile owners. Generally, the car washers include a housing having a continually moving sprocket chain to which the cars are attached in order that they may be towed through the wash apparatus. A crew of men is necessarily provided to mitt the automobile as it is being drawn by. Water and detergent may be dispensed from overhead assemblies onto the passing car while the crew, using rags, wipes down the automobile prior to a final rinse and drying. This type wash apparatus is common throughout the country and well-known by the prior art. Although this equipment represents an extreme advance, and a saving of time and money, over the former methods of car washing, it includes certain inherent limitations and disadvantages.

Apparently, we are living in a "do-it-yourself" age. Therefore, it would appear that it would be desirable to develop an automatic coin-operated "do-it-yourself" automobile wash. The present automatic car wash equipment in use is costly to the automobile owner. It has been found upon investigation that approximately two-thirds of the cost of each wash is allocated for labor; that is, the cost of water, detergent, and equipment amounts to only one-third of the entire cost of washing the car. Therefore, if an efficient "do-it-yourself" automatic car wash could be developed, the automobile owner, with the expenditure of a little labor on his part, could save two-thirds of the usual cost. The automatic car wash described below enables an individual to save considerable time when compared with the time absorbed in washing the automobile at home while considerable expense is saved when compared with washing the automobile in a conventional automatic car wash.

Accordingly, it is the principal object of this invention to provide a novel coin-operated automatic car wash apparatus.

It is a further object of this invention to provide novel automatic car wash apparatus which is efficient in the accomplishment of its function and which includes compact and relatively inexpensive apparatus.

It is a still further object of this invention to provide novel car wash apparatus including coin actuating means to enable an automobile owner to drive his automobile within the apparatus and thereafter allow the apparatus to automatically apply rinse and detergent to the automobile and also provide time for the automobile owner to mitt the automobile prior to a final rinse.

It is a more particular object of this invention to provide novel control features for washing an automobile which includes a movable carriage carrying rinse and detergent dispensing means for passing over an automobile in either direction. Control means are provided to enable the carriage carrying the dispensing means to be reversed by a mechanical limit switch at the forward end of the automobile while providing a photo-electric cell at the rear of the automobile to reverse the movable carriage when it reaches the rear.

In accordance with the above stated objects, below is particularly described apparatus for the automatic car wash comprising the present invention. A housing is provided and includes suspended therefrom a track along which a carriage carrying an inverted U-shaped member may move. The inverted U-shaped member carries liquid dispensing means thereon for applying water to the automobile to rinse it and detergent to the automobile to clean it. A pit within the housing beneath the carriage is provided to accommodate the automobile. Gently sloping surfaces are included in the pit and the surfaces converge at a common point where a drain is placed. A sharply inclined positioning surface is established at the forward end of the pit so that all automobiles accommodated therein will stop with their forward ends at the same position. Power operated doors are provided on the housing for enclosing the apparatus to prevent inclement or undesirably cold weather from hindering the washing procedure. A step relay is provided as a portion of the control means for automatically controlling the apparatus. With the automobile properly positioned in the pit, with the aid of guide blocks, etc., the automobile owner may place a predetermined number of coins in a coin receiver for providing a first electrical impulse to a step relay. The relay will be energized to a first position so as to drive a reversible motor in one direction to move the carriage carrying the liquid dispensing means from the front of the car to the rear thereof. Also, simultaneously with the actuation of the motor to move the carriage past the car, solenoid valve means in a rinse system are opened to provide a pre-rinse for the automobile. When the carriage carrying the inverted U-shaped member and liquid dispensing means, reaches the rear of the automobile, a bank of electric lights positioned in the housing will impress a voltage on the photo-electric cell carried by a leg of the inverted U-shaped member remote from the bank of lights. The photo-electric cell will, through a direct current amplifier, provide a pulse of energy to the step relay to reverse the directional rotation of the motor driving the carriage and inverted U-shaped member. Also, the rinse solenoid valve will be de-energized and so will close and a detergent solenoid valve will open to allow a detergent mixture to flow under pressure upon the automobile. The carriage proceeds then to the front of the automobile and a limit switch is closed for again providing a pulse of energy to the step relay whereby the motor and detergent solenoid valve are de-energized and a conventional timer begins to run for a predetermined period. This allows the automobile owner to mitt the automobile. At the termination of the predetermined time, the step relay again receives a pulse of energy and the step relay moves to a new position to again energize the motor to carry the carriage rearwardly of the automobile. Also, it will be appreciated that the rinse solenoid valve is once again open to provide a rinse to remove the applied detergent. As will be obvious, upon reaching the rear of the automobile, the photo-electric circuit will sense the bank of electric lights to reverse the direction of the motor to return the carriage to the forward end of the car. It is contemplated that a final rinse be provided by maintaining the rinse solenoid valve energized on the return of the carriage to the forward portion of the automobile. At the front of the automobile, the limit switch, being contacted by the moving carriage, stops the motor so that the apparatus is once again in position to receive another automobile whereby the procedure may be repeated. As refinements to the above described system, a fan may be provided subsequent to the final rinse to dry the water from the automobile. Also, a buzzer or some type signal may be provided to advise the mitter that the predetermined time is approaching the limit and that the motor will start to again carry the carriage past the automobile to dispense liquid thereon. In order that the U-shaped member will not seriously injure a person accidentally coming in the way thereof, it is contemplated that conventional slip clutch means be incorporated between the drive motor and the inverted U-shaped member. Piping sections are carried by the inverted U-shaped member for communicating with liquid and detergent sources and nozzles are interposed in the sections for dispensing liquid or detergent on the automobile. It will be appreciated that inasmuch as foreign automobiles are becoming increasingly more popular, the length of cars substantially varies. By utilizing the photo-electric cell as a portion of the control circuit, it will be apparent that water will not be wasted by setting the apparatus for a 20 foot automobile when utilizing it with a 13 foot foreign car. The nozzles should be positioned at different angles so that liquid will principally be dispensed directly at the automobile but, however so that it may also be dispensed on the front, as in the headlight area, and in the back as in the trunk area. Innumerable commercial aspects come to mind and include having vending machines within the housing for selling special cloths, sponges, aprons, etc.

Other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal side sectional view of the apparatus;

FIGURE 2 is a sectional end view of the apparatus;

FIGURE 3 is a sectional view taken substantially along the plane 3—3 of FIGURE 2;

FIGURE 4 is a fragmentary elevational view of the track and carriage means;

FIGURE 5 illustrates a substantially conventional step relay;

FIGURE 6 illustrates a terminal plate utilized in combination with the step relay; and FIGURE 7 is a basic photo-electric circuit for utilization with the invention.

With continuing reference to the drawings and initial reference to FIGURES 1 and 2, numeral 10 generally represents the car wash apparatus including a housing 12 having openings 14 and 16 representing doorways for passage of an automobile 18 therethrough. Tracks 20 and 22 including vertical and horizontal portions are positioned adjacent each of the doorways 14 and 16. Doors 24 and 26 are slidingly carried in the tracks 22 and 20. A pair of beams 28 and 30 are supported in the housing and dependingly support endless sprocket chains (not shown) for driving plates 32 and 34 which are connected to the doors 24 and 26 by links 36 and 38. The sprocket chains (not shown) are driven directly by the pulleys 40 and 42 which are driven by motors 44 and 46. Door control means generally indicated at 48 are provided for opening the doors 24 and 26 by a motorist in car 18. Switch means 50 and 52 within the housing 12 are supplemental means for closing the doors when the automobile 18 is within the housing 12.

A pair of channels 54 and 56 are transversely supported in the housing 12 and support in turn a pair of tracks 58 and 60 extending longitudinally of the housing 12. A carriage 62 passes axle 64 therethrough having a pair of wheels 66 terminally affixed thereto. A pulley 68 is fixed to the axle 64 and communicates with a pulley 70 by belt 72. The pulley 70 is driven by the driveshaft 72 of motor 74 through gear box 71. The motor 74 is a reversible motor which is energized through power cable 75, having leads 77 and 79. It will be appreciated therefore that with the carriage 62 supported on rear rotatable wheels 65 (FIGURE 4), the carriage 62 is capable of movement along the tracks 58 and 60 in either direction dependent upon the running direction of motor 74 which drives the pulley 70 through gear box 71 and accordingly the drive wheels 66 in either direction.

Suspended from the carriage 62 is an inverted U-shaped member 76 having a horizontal bight portion 78 and vertical leg portions 80 and 82. Though FIGURE 3 illustrates the preferable form of U-shaped member 76 as being channel-shaped, this construction is not mandatory. The bight portion 78 is fixed to the carriage 62 by means such as welding. Carried by the legs 80 and 82 are a pair of piping sections 84 and 86. The piping sections 84 and 86 may be clamped to the vertical legs 80 and 82 by a clamp as 88 held by bolt 90. It will be noted that spray nozzles 92 are interposed in the piping sections 84 and 86 and the spray nozzles 92 are angularly related relative to each other for spraying both the forward and rear portions of the automobile. Flexible hoses 94 and 96 communicate the piping sections 84 and 86 through appropriate means to a water source 100. A motor 102 operates a pump 104 for supplying water under pressure to a pipe 106 through a solenoid valve 108 to hose 94. Also, water under pressure may be supplied through a detergent chamber 110, through solenoid valve 112, through pipe 114 to hose 96. In order that the hoses 94 and 96 may be carried along with the movable carriage 76, springs 116 and 118 (FIGURE 2) are terminally connected to the hoses 94 and 96 and the power cable 75 by clamps 120, 122 and 124. The springs 118 and 116 are attached to the eyes 126 and 128 supported by the housing 12 by terminal hooks.

In the utilization of the car wash apparatus, the automobile operator will drive the automobile 18 within the housing 12 through the doorway 14 and park the automobile in the pit 130. The pit 130 has gently sloping surfaces which converge at a common point 132 whereat is placed a drain 134. A sharply inclined positioning surface 136 advises the operator of the automobile 18 that the automobile is correctly positioned with the front wheels 138 of the automobile abutting the shoulder 140. Guide blocks 142 are provided to initially guide the automobile operator into correct position so that the automobile 18 is positioned between the depending vertical legs 80 and 82 of U-shaped member 76. By placing a predetermined number of coins in the conventional coin receiver 141, an impulse of direct current energy will be impressed across terminals 150 and 152 of winding 154 on core 156 of step relay 148 (FIGURE 5). An arm 158 carrying a pawl 160 is pivoted at 162. Upon energization of the winding 154, the magnetizable plate 164 will be drawn toward the core 156 and the arm 158 will be pivoted about the point 162 so that the pawl 160 will turn ratchet 166 one step and along therewith will turn shaft 168 and plate 170. A spring 172 returns the arm 158 to the position illustrated in FIGURE 5 subsequent to initial energization and de-energization of winding 154. The spring 172 must be attached to a fixed member as 174. The plate 170 carries a pair of metallic pins 176 and 178 which have end flanges 180 and are urged outwardly from the plate 170 by springs 182. Positioned proximate plate 170 is plate 184 (FIGURE 6) having a plurality of pairs of terminals as 185 and 186, 187 and 188, 189 and 190, 191 and 192, 193 and 194, and 195 and 196. The various terminal pairs are spaced by insulators 200. Apparently, the metallic pins 176 and 178 are spring urged into contact with the terminals as 195 and 196 and accordingly a circuit connected thereto is completed or bridged through metallic plate 170. Continuing with the operation, upon insertion of the proper number of coins into the coin receiver 141, the step relay 148 is stepped to a first position so that the contacts 185 and 186 are electrically bridged. The leads 77 and 79 are included in a circuit connected to terminals 185 and 186 and upon bridging thereof, the motor 74 is energized to carry the carriage 62 toward the rear of the automobile 18. Simultaneously, the leads 115 and 117 are bridged to open the solenoid valve 108 to allow water under pressure to be dispensed through the pipe section 84 and nozzles 92. The carriage 62 driven by motor 74 proceeds to the rear of the automobile 18. A photoelectric cell circuit 200 is carried by the leg 80 of the U-shaped member 76. The photo-electric cell circuit includes a photo-electric cell 202 connected to a resistor 204 to the grid 206 of a triode 208 constituting a DC amplifier. A plate voltage source 210 is provided and the output terminals 212 and 216 are connected to leads 150 and 152 of winding 154 on core 156. A bank of electric lights 218 is positioned proximate the rear of the automobile 18 and extends approximately 10 feet so as to accommodate cars ranging from 13 feet to 23 feet in length. When the photo-electric cell 202 carried by the leg 80 passes the automobile 18 and senses the bank of lights 218 the step relay 148 is actuated and the pins 176 and 178 then bridge terminals 187 and 188. Of course, the solenoid valve 108 closes and then leads 111 and 113, which are included in the circuit connected to terminals 187 and 188 are energized to open the solenoid valve 112 to allow detergent to flow from the piping section 86 through the nozzles 92. Also, the polarity connection to leads 77 and 79 of motor 74 are reversed so that the carriage 62 traverses the housing 12 in a reverse direction toward the front of the automobile 18. When the carriage 62 contacts limit switch 220, a pulse from leads 222 and 224 is impressed on coil 154 to energize the step relay 148. It will be appreciated therefore that the automobile 18 has been pre-rinsed as the carriage 62 has passed from front to rear and detergent has been applied as the carriage has gone from rear to front. The pins 176 and 178 are now bridging terminals 189 and 190 and accordingly, the timer 230 is energized through leads 232 and 234. The automobile operator may now mitt the automobile. A predetermined time is prescribed and approximately 15 or 30 seconds before the end thereof, a light or audible alarm 236 is actuated through leads 238 and 240 to advise the operator that the cycle is going to begin again. Upon reaching the end of the timing cycle, the winding 154 of step relay 148 is again actuated and the pins 176 and 178 then bridge terminals 191 and 192. The motor 74 and solenoid valve 108 are energized so that the carriage 62 passes over the automobile from front to rear rinsing the detergent from the automobile 18. The photo-electric cell 202 detects the lights 218 when the carriage 62 is at the rear of the automobile 18 and the winding 154 of step relay 148 is energized to return the carriage 162 to the forward end of the automobile. During this last cycle the solenoid valve 108 remains energized for a final rinse of the automobile. Upon contact of the limit switch 220, the coil 154 is again energized to actuate the step relay 148 and stop the motor 74 to stop the carriage 62 movement. At this stage, the step relay 148 is in the position it was in at the beginning of the entire cycle when the automobile 18 first entered the housing 12 through the doorway 14. In order to aid in the drying process, a fan 230 supported by structural members 232 is energized through leads 234 and 236.

It is thought that it will accordingly be appreciated that what has been described is a full and clear disclosure wherein one skilled in the art could fully interpret the invention. It is submitted that the invention lies in the novel combination and utilization of substantially old elements and it is further submitted that the invention represents a significant advance in the automobile washing art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic car wash for vehicles within a predetermined dimensional range comprising, housing means for enclosing a vehicle therein, carriage means movably mounted by the housing means in spaced relation above the vehicle, wash means carried by the carriage means for applying cleansing and rinsing liquid to the vehicle, reversible motor means carried by the carriage means, for propelling the carriage means and means operatively connected to the motor means and normally rendered inoperative by the presence of the vehicle in the housing means only when the carriage means is not beyond the vehicle and is rendered operative when the carriage means moves beyond the vehicle for reversal of the motor means.

2. The combination of claim 1 including control means operatively connected to the wash means for changing between the application of cleansing and rinsing liquid to the vehicle upon reversal of the motor means.

3. The combination of claim 2 wherein said control means includes timer means for rendering the wash means inoperative for a predetermined interval of time.

4. A coin-operated automatic car wash comprising a housing, an overhead wash assembly supported from said housing, said assembly including a track, a carriage movable along said track, an inverted U-shaped member suspended from said carriage adapted to pass over a car in said housing, liquid dispensing means carried by said member along the length thereof, drive means for reversibly moving said carriage along said track to carry said liquid dispensing means past said car, control means for coordinately controlling said liquid dispensing means and said drive means, said control means including a step relay, a plurality of devices for energizing said relay, said devices including a limit switch positioned adjacent said track in the path of said carriage for providing a pulse actuating said relay; a coin control device for providing a pulse actuating said relay, a photo-electric circuit for providing a pulse actuating said relay, and a timer for providing a pulse actuating said relay.

5. A coin-operated automatic car wash comprising a housing, an overhead wash assembly supported from said housing, said assembly including a track, a carriage movable along said track, an inverted U-shaped member suspended from said carriage adapted to pass over a car in said housing, liquid dispensing means carried by said member along the length thereof, drive means for reversibly moving said carriage along said track to carry said liquid dispensing means past said car, control means for coordinately controlling said liquid dispensing means and said drive means, said control means including a step relay, a plurality of devices for energizing said relay, said drives including a limit switch positioned adjacent said track in the path of said carriage for providing a pulse actuating said relay, a coin control device for providing a pulse actuating said relay, a photo-electric circuit for providing a pulse actuating said relay, and a timer for providing a pulse actuating said relay, said photo-electric circuit including a bank of lights positioned at the rear of and at one side of said housing, proximate the rear of a car in said housing a photo-electric cell carried by a leg of said U-shaped member remote from said bank of lights whereby said bank of lights will actuate said photo electric circuit when said leg carrying said photo-electric cell passes said car rear.

6. A coin-operated automatic car wash comprising a housing, an overhead wash assembly supported from said housing, said assembly including a track, a carriage movable along said track, an inverted U-shaped member suspended from said carriage adapted to pass over a car in said housing, liquid dispensing means carried by said member along the length thereof, drive means for reversibly moving said carrige along said track to carry said liquid dispensing means past said car, control means for coordinately controlling said liquid dispensing means and said drive means, said control means including a step relay, a plurality of devices for energizing said relay, said drives including a limit switch positioned adjacent said track in the path of said carriage for providing a pulse actuating said relay, a coin control device for providing a pulse actuating said relay, a photo-electric circuit for providing pulse actuating said relay, and a timer for providing a pulse actuating said relay, said photo-electric circuit including a bank of lights positioned at the rear of and at one side of said housing, proximate the rear of a car in said housing a photo-electric cell carried by a leg of said U-shaped member remote from said bank of lights whereby said bank of lights will actuate said photo electric circuit when said leg carrying said photo-electric cell passes said car rear, said liquid dispensing means including solenoid valves, said solenoid valves controlled by said step relay.

References Cited in the file of this patent
UNITED STATES PATENTS

| | | |
|---|---|---|
| 2,013,742 | Butler | Sept. 10, 1935 |
| 2,238,872 | Mather | Apr. 15, 1941 |
| 2,471,506 | Wiswall | May 31, 1949 |
| 2,676,600 | Vani | Apr. 27, 1954 |
| 2,703,579 | Merancy | Mar. 8, 1955 |
| 2,751,915 | Roberts | June 26, 1956 |
| 2,756,759 | Swain | July 31, 1956 |